US011309986B2

(12) United States Patent
Guo et al.

(10) Patent No.: US 11,309,986 B2
(45) Date of Patent: Apr. 19, 2022

(54) QTTH SYSTEM BASED ON MULTICORE OPTICAL FIBER MODE DIVISION MULTIPLEXING AND TRANSMISSION METHOD THEREOF

(71) Applicant: GUANGDONG INCUBATOR TECHNOLOGY DEVELOPMENT CO., LTD, Guangdong (CN)

(72) Inventors: Banghong Guo, Guangdong (CN); Qianlin Zhang, Guangdong (CN)

(73) Assignee: GUANGDONG INCUBATOR TECHNOLOGY DEVELOPMENT CO., LTD, Guangzhou (CN)

(*) Notice: Subject to any disclaimer, the term of this patent is extended or adjusted under 35 U.S.C. 154(b) by 0 days.

(21) Appl. No.: 17/362,964

(22) Filed: Jun. 29, 2021

(65) Prior Publication Data
US 2022/0029729 A1    Jan. 27, 2022

Related U.S. Application Data

(63) Continuation of application No. PCT/CN2019/129498, filed on Dec. 27, 2019.

(30) Foreign Application Priority Data

Dec. 31, 2018 (CN) .......................... 201811651240.2

(51) Int. Cl.
*H04B 10/70* (2013.01)
*H04J 14/04* (2006.01)
(Continued)

(52) U.S. Cl.
CPC .......... *H04J 14/04* (2013.01); *H04B 10/2581* (2013.01); *H04B 10/70* (2013.01); *H04J 14/0245* (2013.01)

(58) Field of Classification Search
None
See application file for complete search history.

(56) References Cited

U.S. PATENT DOCUMENTS 8,320,724 B2* 11/2012 Sasaoka ............... G02B 6/4249
385/121
8,977,121 B2* 3/2015 Djordjevic .......... H04J 14/0201
398/44
(Continued)

FOREIGN PATENT DOCUMENTS

CN   108028718 A   5/2018
CN   208015742 U   10/2018
(Continued)

OTHER PUBLICATIONS

Asif, Rameez, Future Quantum-to-the-Home (QTTH) All-Optical Networks, 2018, IEEE (Year: 2018).*
(Continued)

*Primary Examiner* — Jai M Lee

(57) ABSTRACT

A QTTH system based on multicore optical fiber mode division multiplexing, wherein comprising: an OLT end, a MDM-ODN and an ONU end, wherein the OLT end, the MDM-ODN and the ONU end are sequentially connected by an optical fiber; the MDM-ODN comprising a mode multiplexer and a mode demultiplexer, and the mode multiplexer and the mode demultiplexer are connected with each other through MCF, the OLT end comprising a classical signal transmitter, N DV-QKD units and N+1 mode convertors of the OLT end; the ONU end comprising N DV-QKD receivers, a classical signal receiver, N+1 mode convertors of the OLT end, 2N+1 PDs and one OC of the ONU end; the N DV-QKD receivers are respectively connected with the mode demultiplexer through PDs; the N+1 mode convertors of the OLT end are connected with the demultiplexer.

20 Claims, 5 Drawing Sheets

(51) Int. Cl.
*H04B 10/2581* (2013.01)
*H04J 14/02* (2006.01)

(56) References Cited

U.S. PATENT DOCUMENTS

| | | | | |
|---|---|---|---|---|
| 9,800,352 | B2* | 10/2017 | Frohlich | H04B 10/85 |
| 10,313,113 | B2* | 6/2019 | Frohlich | H04L 9/0852 |
| 10,887,013 | B2* | 1/2021 | Ashrafi | H04L 25/03006 |
| 2007/0133798 | A1* | 6/2007 | Elliott | H04L 9/0858 |
| | | | | 380/255 |

FOREIGN PATENT DOCUMENTS

| | | | | |
|---|---|---|---|---|
| EP | 2209031 A2 * | 7/2010 | | G02B 6/264 |
| WO | WO-2014038095 A1 * | 3/2014 | | H04J 14/02 |

OTHER PUBLICATIONS

Cai et al., Multicore fiber-based quantum access network, 2019 (Year: 2019).*

* cited by examiner

QTTH SYSTEM BASED ON MULTICORE OPTICAL FIBER MODE DIVISION MULTIPLEXING AND TRANSMISSION METHOD THEREOF

CROSS REFERENCE TO RELATED APPLICATIONS

The present application is a Continuation Application of PCT Application No. PCT/CN2019/129498 filed on Dec. 27, 2019, which claims the benefit of Chinese Patent Application No. 201811651240.2 filed on Dec. 31, 2018. All the above are hereby incorporated by reference in their entirety.

TECHNICAL FIELD

The disclosure relates to the field of quantum information, in particular to a QTTH system based on multicore optical fiber mode division multiplexing and transmission method thereof.

BACKGROUND

Date security is urgently to be solved for a classic FTTH (Fiber To The Home) end user, and the absolute security of QC (Quantum Cryptography) is theoretically proven to be more and more concerned. The unconditional protection protocol of QC and QKD (Quantum Key Distribution) can ensure the information theoretical security of random bit Distribution between two remote user parties. In recent years, due to the compatibility and cost of devices, the application of an end-to-end quantum communication network, which is widely applied in practical use, is far from being realized. To reduce the cost of QKD network applications, the existing FTTH networks can be utilized to integrate QKD and the traditional optical communications together, thereby minimizing the installation and operational costs.

A common technique for realizing quantum and classical integration is WDM (Wavelength Division Multiplexing), for Embodiment, an integration experiment of quantum key distribution based on Wavelength Division Multiplexing and gigabit passive optical network proposed by Wei Sun et al in 2015. However, in consideration of the nonlinear effect of the optical fiber and the requirement of the SNR(Signal to Noise Ratio) for high-speed transmission, the WDM technology using single-mode optical fiber is approaching the limit of capacity, and extra devices are required on the line, which may introduce extra crosstalk and loss and possibly impair the final safety, so it is urgently needed to provide a new multiplexing technology to improve the optical transmission capacity, increase the spectral efficiency, and meet the increasing capacity requirement. The MDM (Mode Division Multiplexing) and SDM (Space Division Multiplexing) technologies are expected to solve the problem of transmission capacity.

In 1982, MDM was first proposed by S. Berdague and P. Facq, they used spatial filters to selectively stimulate two low-order modes of the graded-index multimode fiber for transmission, with crosstalk between the two modes being less than −20 dB after 10 meters of transmission, thus demonstrating the feasibility of mode division multiplexing in short distance transmission. However, there are a series of problems of modal dispersion, intermodal crosstalk, larger loss and the like of the provided multimode optical fiber, while the multicore optical fiber provided by this disclosure can effectively reduce the modal dispersion, and the heterogeneous groove-type structure can further reduce the intermodal crosstalk and the nonlinear loss. MDM is a multiplexing method for transmitting information by using mutually orthogonal modes in an optical fiber as an independent channel, and is essentially an optical multiple input and output process. The MDM can be classified into OAM (Orbital Angular Momentum) based on vortex fiber, mode division multiplexing of few-mode fiber and multi-core fiber according to the technical concept.

The OAM mode is distributed annularly, so that the modes have the advantage of unsusceptible interference, but light beams carried by the OAM mode are easily influenced by the external environment and can only be transmitted in special optical fibers such as vortex optical fibers. Many researchers have proposed mode division multiplexing with few-mode fibers, for Embodiment, a novel MDM-PON (Passive Optical Network) scheme using self-nonlinear detection is proposed by Yuanxiang Chen et al in 2015 for high-speed/capacity access network. The few-mode fiber effectively reduces modal dispersion by only stimulating a few modes, and the larger mode field radius can effectively inhibit the nonlinear effect, but the larger mode field radius inevitably has stronger intermodal dispersion and modal coupling effect.

The present disclosure integrates QKD and FTTH through the mode division multiplexing technique, compared with other schemes, on the basis of expanding transmission capacity and reinforcing security, the present disclosure uses heterogeneous groove-type auxiliary seven-core fiber to further reduce the intermodal coupling and increase the mode field effective area.

"Prior art patents: (CN 208015742U) provides a system for quantum key distribution and PON equipment shared-fiber transmission, but shared-fiber transmission uses a wavelength division multiplexing technologies based on single-mode optical fiber, and is already approaching the limit of communication capacity."

"Prior art patents: the (CN108028718A) improves the communication capacity of FTTH by using the mode division multiplexing technique, but it is not using the QKD technique, and therefore it is deficient in security."

SUMMARY OF THE DISCLOSURE

The disclosure provides a QTTH (representing QKD and FTTH integration) system based on multicore optical fiber mode division multiplexing and transmission method thereof for improving communication capacity and safety. The disclosure provides heterogeneous groove-type auxiliary seven-core fiber to implement mode division multiplex, which can enlarge communication capacity, make weak quantum signals receive less interference of classical signal than other schemes because of its structure of physical isolation, and easily obtain better quantum key distribution performance when quantum and classical are transmitted simultaneously, and the heterogeneous groove-type structure can effectively reduce intermodal crosstalk and increase the effective mode field area of light efficiency.

The disclosure provides a QKD technology (DV-QKD) based on a decoy state asymmetric BB84 protocol. In the BB84 protocol, a transmitter Alice randomly sends two sets of single photons under non-orthogonal basis vectors, and a receiver Bob randomly selects a basis vector for measurement, and ideally, when the transmitter and the receiver use the same basis vector, both the transmitter and the receiver will obtain a secure and consistent secret key. The asymmetry is realized by that the two groups of non-orthogonal basis vectors are selected with different probabilities, the basis with the higher probability is selected for key generation, and the basis with the lower probability is selected for security detection, so that the mode can realize higher final key rate. In order to solve the security vulnerabilities introduced by multi-Photon pulse and channel loss in the actual QKD system, the disclosure further introduces a decoy state only used for detecting PNS (Photon Number Splitting), that is, the transmitter randomly selects light sources (signal state and decoy state) of different intensities to send to the receiver. In order to achieve the technical effects, the technical scheme of the disclosure is as follows:

a QTTH system based on multicore optical fiber mode division multiplexing comprising: an OLT end (Optical Line Terminal), a MDM-ODN (Mode Division Multiplexing-Optical Distribution Network) and an ONU end (Optical Network Unit), wherein the OLT end, the MDM-ODN and the ONU end are sequentially connected by an optical fiber;

the MDM-ODN comprising a mode multiplexer and a mode demultiplexer, and are connected with each other through a multi-core Fiber (MCF), wherein the MCF is a heterogeneous groove-type auxiliary seven-core fiber;

the OLT end comprising a classical signal transmitter, N DV-QKD (Discrete Variable-Quantum Key Distribution) units and N+1 mode convertors of the OLT end, wherein one end of the N+1 mode convertors is connected with the classical signal transmitter, and the other end of the N+1 mode convertors is connected with a mode multiplexer of the MDM-ODN;

the ONU end comprising N DV-QKD receivers, a classical signal receiver, N+1 mode convertors of the OLT end, 2N+1 PDs (light detectors) and one OC of the ONU end; the N DV-QKD receivers are respectively connected with the mode demultiplexer through PDs (light detectors); N+1 mode convertors of the OLT end are connected with the demultiplexer, wherein the mode convertors of the N ONU end are respectively connected with the classical signal receivers through PDs, and the remaining one mode convertor of the ONU end is respectively connected with each classical signal receiver through one PD and an OC (Optical Circulator) of the ONU end;

when the N+1 classical signals sent by the classical signal transmitter are converted from a basic mode to different mutually orthogonal modes through the mode convertor, the mutually orthogonal modes enter the mode multiplexer with the N quantum signals sent by the N DV-QKD units to be converted into a mode suitable for MCF transmission, and are sent to the mode demultiplexer through the MCF to be decomposed into independent N+1 classical signals and N quantum signals; each decomposed classical signal is converted into a mode of a basic mode through a mode convertor and is sent to a classical signal receiver through a connected PD; the quantum signal is sent through the connected PD to the DV-QKD receiver.

Preferably, the classical signal transmitter comprises a laser diode, an optical circulator and N intensity modulators, wherein the mode convertors of the N OLT ends are respectively connected with the optical circulator through the intensity modulators, and the remaining one mode convertor of the OLT end is directly connected with the optical circulator;

the N+1 classical signals comprise one pilot signal and N OOK (On-Off Keying) signals.

More preferably, the PD uses an InGaAs avalanche photodiode operating in a Geiger mode.

When MCF is used for transmission, a quantum signal uses a 1550 nm wavelength channel; the classical signal uses an upstream 1490 nm wavelength channel or a downstream 1310 nm wavelength channel.

More preferably, the mode multiplexer and the mode demultiplexer are composed of cascaded mode select couplers.

In the above, the DV-QKD unit is a DV-QKD unit for generating a quantum signal based on a decoy state asymmetric BB84 protocol.

Furthermore, the radius of the fiber core of the MCF is 5 mu m, and a refractive index groove is arranged on the outer side of the fiber core of the MCF; the thickness of the refractive index grooves is 3 μm, and the core pitch of the MCF is 42 μm.

Furthermore, the core refractive index of the MCF is 1.4457; the refractive index difference between the core of the MCF and the cladding of the MCF is 0.003, and the refractive index difference between the refractive index grooves and the cladding of the MCF is 0.003.

A transmission method of based on multi-core fiber mode division multiplexing QTTH comprising the following steps:

S1, system noise test: testing system noise under the condition that the OLT end emits the laser pulse train, and judging whether the signal-to-noise ratio is higher than the preset value of a set signal-to-noise ratio, if the signal-to-noise ratio is higher than the preset value of a set signal-to-noise ratio, entering steps S2 and S2', and if the signal-to-noise ratio is lower than the preset value of a set signal-to-noise ratio, generating prompt information;

S2, quantum state preparation: the DV-QKD unit preparing a quantum state according to a decoy state asymmetric BB84 protocol to generate a quantum signal;

S2', OOK modulation: the classical signal transmitter divides a classical signal into N+1 signals through an optical circulator, wherein one signal serves as a pilot signal, and the other N signals are modulated into N OOK signals through an intensity modulator; meanwhile, the classical signal comprises a pilot signal and N OOK signals.

S2'.1, mode conversion: performing mode conversion on each classical signal obtained in the step S2' through a mode convertor;

S3, mode multiplexing transmission: the signals obtained through S2 and S2'.1 enter MCF through a mode multiplexer for multiplexing transmission and then reach a mode demultiplexer to be decomposed into multiple signals;

S4, mode conversion: each classical signal is converted into a basic mode signal through a mode convertor;

S5, self-homodyne detection: performing self-homodyne detection on each OOK signal;

S6, error rate detection: the ONU end randomly selects a part of DV-QKD screening codes to detect the error rate; and if the measured error code rate value is greater than or equal to the theoretical calculation value of the decoy state, returning to the steps S2 and S2', and if the measured error code rate value is less than the theoretical calculation value of the decoy state, then establishing safe communication.

Preferably, the preset value of the signal-to-noise ratio is 20 dB, and the theoretical calculation value of the decoy state is 11%.

Compared with the prior art, the technical scheme of the disclosure has the beneficial effects that:

1) the QTTH technology is implemented by using a mode division multiplexing technology, and the previously proposed multiplexing technologies based on single mode fiber WDM/TDM approach the limit of reaching the transmission capacity, and additional equipment is required on the line, which may introduce extra loss and crosstalk and possibly impair the final security. The mode division multiplexing of the disclosure provides the orthogonal mode to multiplex, and can improve the transmission capacity and the final safety of the optical communication.

2) The mode division multiplexing is realized by using the heterogeneous groove-type auxiliary multi-core optical fiber, which is isolated based on a physical structure, so that a strong classical signal and a weak quantum signal have excellent signal-to-noise ratio and isolation between the cores when being transmitted simultaneously, thus ensuring higher stability and robustness of the system, and strict and independent channels can be transmitted through the same optical fiber. And using a heterogeneous groove-type auxiliary structure can effectively reducing the interference of strong classical signals to weak quantum signal, increasing the area of an optical fiber effective field, and reducing the crosstalk among different modes.

The self-homodyne detection technology can effectively suppress laser phase noise, and independent OOK signals can be directly detected without a multi-input and multi-output DSP (digital signal processing) of polarization compensation and pilot frequency phase correction.

3) Two fiber cores of the MCF are used for generating mutually unbiased basis, and a quantum signal is generated by using a decoy state asymmetric BB84 protocol. The method can effectively resist PNS attack, improve the generation rate and the safety of the secret key, and increase the transmission distance.

DETAILED DESCRIPTION

The technical solutions in the embodiments of the present disclosure will be clearly and completely described below with reference to the drawings in the embodiments of the present disclosure, and it is obvious that the described embodiments are only a part of the embodiments of the present disclosure, but not all of the embodiments. All other embodiments, which can be obtained by a person skilled in the art based on the embodiments of the present disclosure without creative work, are within the scope of the present disclosure.

Embodiment 1

Figure 1:
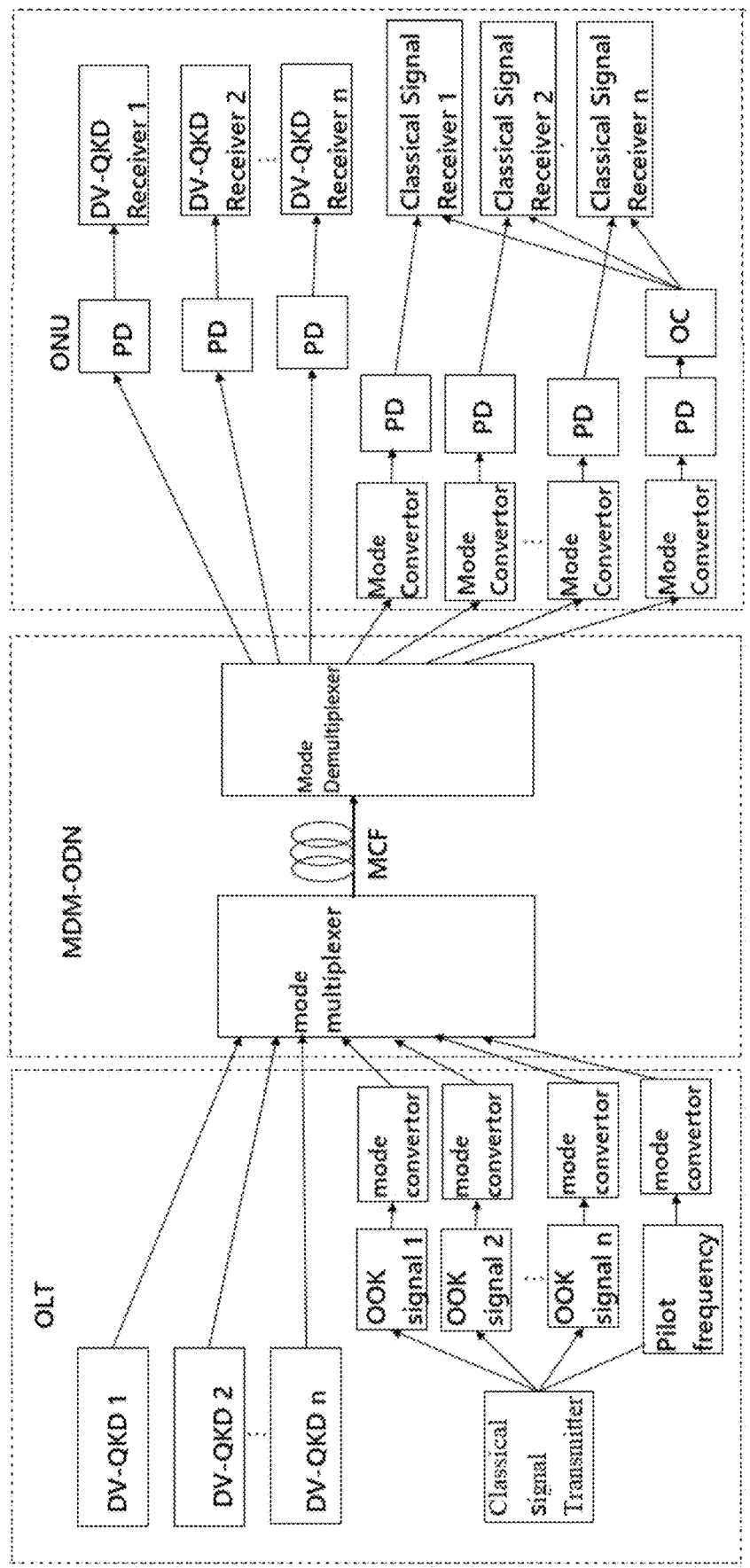
FIG. 1 is a whole structure frame diagram of the QTTH system based on multi-core fiber mode division multiplexing of the disclosure.

A QTTH system based on multicore optical fiber mode division multiplexing, as shown in FIG. 1, comprising: an OLT end, an MDM-ODN end and an ONU end sequentially connected through optical fibers.

The MDM-ODN comprises a mode multiplexer and a mode demultiplexer, wherein the mode multiplexer and the mode demultiplexer are both composed of cascade mode select couplers and are connected with each other through MCF (micro channel fiber), and the MCF is a heterogeneous groove-type auxiliary seven-core optical fiber and has the advantages of low crosstalk and large mode field area. In addition, the cascade mode select coupler is based on the phase matching principle, evanescent-field coupling occurs when the basic mode and the high-order mode reach phase matching, which can output the mode separation function of different modes at different ports, so that the cascade mode select coupler can be effectively used as a mode multiplexer and a mode demultiplexer, and has the advantages of easiness in manufacturing, high compatibility with optical fibers, low mode crosstalk and the like.

the OLT end comprising a classical signal transmitter, N DV-QKD (Discrete Variable-Quantum Key Distribution) units and N+1 mode convertors of the OLT end, wherein one end of the N+1 mode convertors is connected with the classical signal transmitter, and the other end of the N+1 mode convertors is connected with a mode multiplexer of the MDM-ODN;

the ONU end comprising N DV-QKD receivers, a classical signal receiver, N+1 mode convertors of the OLT end, 2N+1 PDs (light detectors) and one OC of the ONU end; the N DV-QKD receivers are respectively connected with the mode demultiplexer through PDs (light detectors); N+1 mode convertors of the OLT end are connected with the demultiplexer, wherein the mode convertors of the N ONU end are respectively connected with the classical signal receivers through PDs, and the remaining one mode convertor of the ONU end is respectively connected with each classical signal receiver through one PD and an OC (Optical Circulator) of the ONU end;

when the N+1 classical signals sent by the classical signal transmitter are converted from a basic mode to different mutually orthogonal modes through the mode convertor, the mutually orthogonal modes enter the mode multiplexer with the N quantum signals sent by the N DV-QKD units to be converted into a mode suitable for MCF transmission, and are sent to the mode demultiplexer through the MCF to be decomposed into independent N+1 classical signals and N quantum signals; each decomposed classical signal is converted into a mode of a basic mode through a mode convertor and is sent to a classical signal receiver through a connected PD; the quantum signal is sent through the connected PD to the DV-QKD receiver.

Wherein the PD uses an InGaAs avalanche photodiode operating in a Geiger mode.

Specifically, the classical signal transmitter comprises a laser diode, an optical circulator and N intensity modulators, wherein the mode convertors of the N OLT ends are respectively connected with the optical circulator through the intensity modulators, and the remaining one mode convertor of the OLT end is directly connected with the optical circulator; and the N+1 classical signals comprise one pilot signal and N OOK (On-Off Keying) signals. The classical signal generator generates a pilot signal, and has the advantages that coherent detection can be used at a receiving end to improve the spectrum efficiency and the network coverage, the related cost caused by using a narrow-band Local Oscillator (LO) on the ONU is reduced, and an OOK signal can be independently received through automatic detection.

Specifically, the DV-QKD unit generates quantum signals for key distribution based on a decoy state asymmetric BB84 protocol, and the protocol utilizes the space dimension of MCF instead of polarization as a degree of freedom. The working principle of the system is that quantum signals transmitted in any two fiber cores of the MCF are utilized to generate two mutually unbiased basis, and for the core A and the core B, the basis X is defined as ($|A\rangle$; $|B\rangle$) and the basis Y is defined as ($|A+B\rangle$, $|A-B\rangle$)) and a final secret key rate is R≥$I_{AB}$−min ($I_{AE}$,$I_{BE}$), wherein $I_{AB}$ represents the classical mutual information $I_{XY}$=H(X)−H(X|Y) between Alice (DV-QKD unit at OLT end) and Bob (DV-QKD receiver at ONU end) and min ($I_{AE}$,$I_{BE}$) relates to Alice and Eve or quantum mutual information between Alice and Eve. The asymmetry is realized by that the basis X and the basis Y are selected with different probabilities, the basis with the higher probability is selected for key generation, and the basis with the lower probability is selected for security detection, so that the mode can realize higher final key rate. Meanwhile, the disclosure further introduces a decoy state for effectively resisting PNS (Photon Number Splitting).

Furthermore, since the multi-core fiber inevitably has intermodal coupling, a power coupling equation is required to analyze the transmission characteristics of the multi-core fiber to determine whether the multi-core fiber meets the requirement of mode division multiplexing. The power coupling mode theory is that a system average value is introduced into the mode coupling theory, and the power is directly used as a coupling parameter, so that the problem of crosstalk between cores in the multi-core optical fiber can be effectively analyzed. When only the power coupling of the adjacent cores is taken into account, the power $P_i$ in the $i^{th}$ core can be expressed as:

$$\frac{dP_i(z)}{dz} = \sum_i h_{ij}[P_j(z) - P_i(z)]$$

the summation sign represents the sum of the coupling power of adjacent fiber cores, and $h_{ij}$ represents the power coupling coefficient between the $i^{th}$ fiber core and the $j^{th}$ fiber core. Assuming that the power coupling coefficients between the central core and the surrounding cores are equal to each other, i.e., h, and the power coupling coefficients between the surrounding cores are also equal to each other, i.e., g, the formula can be specifically expressed as follows:

$$\frac{dP_1}{dz} = h(P_2 - P_1) + h(P_3 - P_1) +$$
$$h(P_4 - P_1) + h(P_5 - P_1) + h(P_6 - P_1) + h(P_7 - P_1)$$
$$\frac{dP_2}{dz} = h(P_1 - P_2) + g(P_3 - P_2) + g(P_4 - P_2) +$$
$$g(P_5 - P_2) + g(P_6 - P_2) + g(P_7 - P_2)$$
$$\frac{dP_3}{dz} = h(P_1 - P_3) + g(P_2 - P_3) + g(P_4 - P_3) +$$
$$g(P_5 - P_3) + g(P_6 - P_3) + g(P_7 - P_3)$$
$$\frac{dP_4}{dz} = h(P_1 - P_4) + g(P_2 - P_4) + g(P_3 - P_4) +$$
$$g(P_5 - P_4) + g(P_6 - P_4) + g(P_7 - P_4)$$

-continued
$$\frac{dP_5}{dz} = h(P_1 - P_5) + g(P_2 - P_5) + g(P_3 - P_5) +$$
$$g(P_4 - P_5) + g(P_6 - P_5) + g(P_7 - P_5)$$
$$\frac{dP_6}{dz} = h(P_1 - P_6) + g(P_2 - P_6) + g(P_3 - P_6) +$$
$$g(P_4 - P_6) + g(P_5 - P_6) + g(P_7 - P_6)$$

adding all the above formulas to obtain:

$$\frac{dP_1}{dz} = hP - 6hP_1$$
$$\frac{dP}{dz} = 6hP_1 - hP$$

in the formula, P=$\Sigma_{k=2}^{7} P_k$, the power of the central fiber core at the point z=0 is defined as $P_1(0)$, and the normalized power of the central fiber core and the surrounding fiber core in the seven-core optical fiber are obtained according to the two formulas:

$$\frac{P_1(z)}{P_1(0)} = \frac{1 + 6\exp - (7hz)}{7} \qquad (0)$$
$$\frac{P_k(z)}{P_1(0)} = \frac{1 + \exp - (7hz)}{7}$$

where $P_k(z)$ (k=2, 3, . . . , 7) is the optical power of the $k^{th}$ core, then the crosstalk of the surrounding cores under the condition that the middle core is excited is as follows:

$$X_P(z) = \frac{1 - \exp - (7hz)}{1 + \exp - (7hz)}$$

it can be seen that the power coupling coefficient has a large influence on the crosstalk of the multi-core fiber. The crosstalk conditions under different random errors in the multi-core fiber are calculated by utilizing a power coupling mode theory, and the fact that the crosstalk is reduced when the diameter difference between fiber cores is increased is found, so that the fact that the heterogeneous multi-core fiber effectively inhibits the intermodal crosstalk is proved. Compared with a non-groove structure, the crosstalk is integrally reduced by about 20-30 dB by providing a groove structure, so that the mode field area is increased by increasing the inner diameter of the groove, reducing the outer diameter of the groove and reducing the refractive index difference between the groove and the cladding, and the nonlinear damage is further reduced. Therefore, the heterogeneous groove-type structure seven-core optical fiber can enable light waves to be transmitted in respective fiber cores, greatly reduces coupling between the fiber cores, and can be used for mode division multiplexing.

Figure 2:
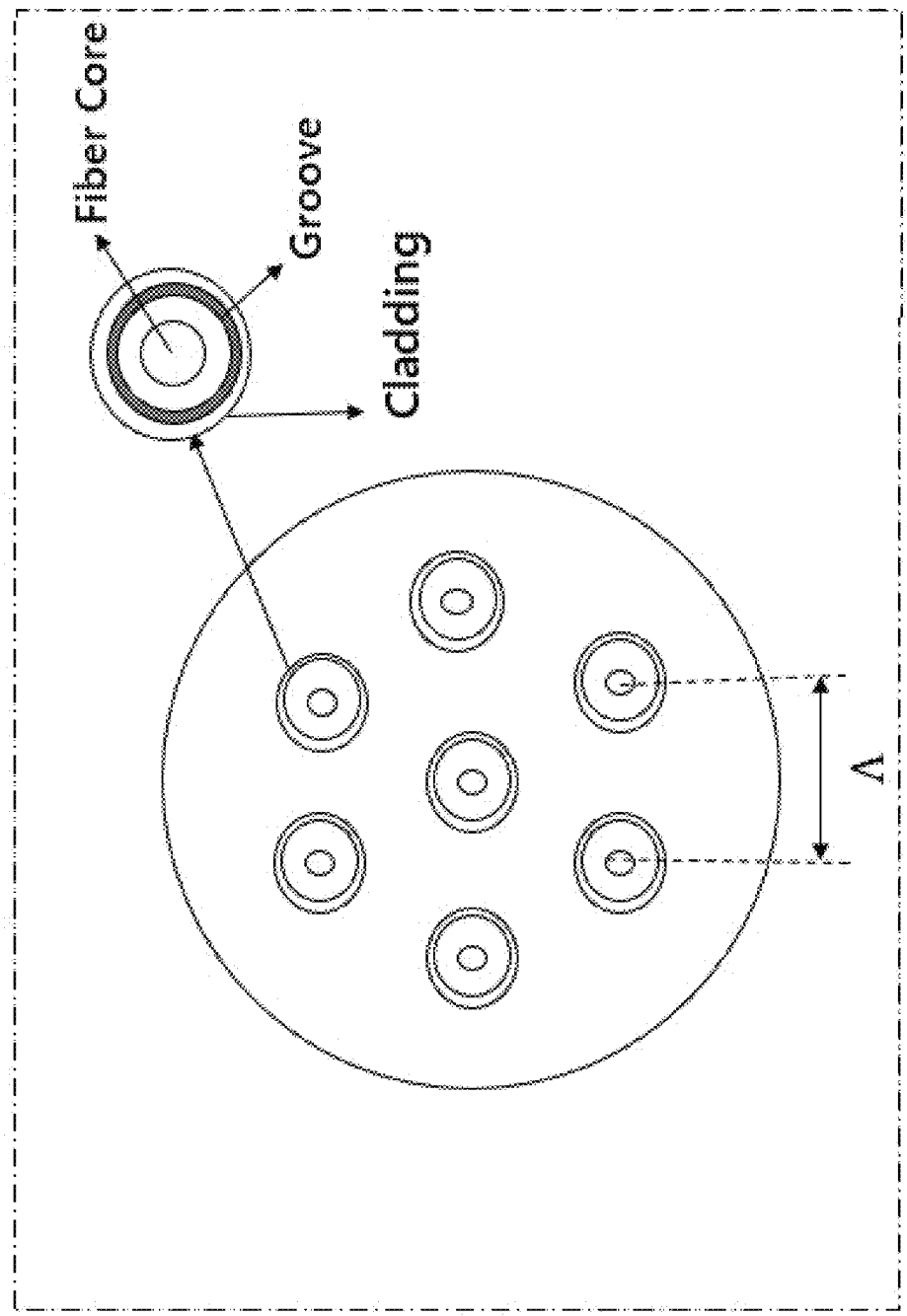
FIG. 2 is a cross-sectional view of a heterogeneous groove-type auxiliary seven-core fiber of the multi-core fiber mode division multiplexing-based QTTH system of the present disclosure.

More specifically, as shown in FIG. 2, for a groove-type structure core, the structure at the upper right corner in the figure has a core in the middle, and a cladding and t groove-type are provided outside the core, A represents the core pitch, and is set to 42 μm. Due to the refractive index groove structure around the fiber core, the electric field far away from the fiber core is restrained, so that the overlapping integral between the electric fields of the adjacent fiber cores is reduced, and the crosstalk is restrained to a certain degree.

Figure 3:
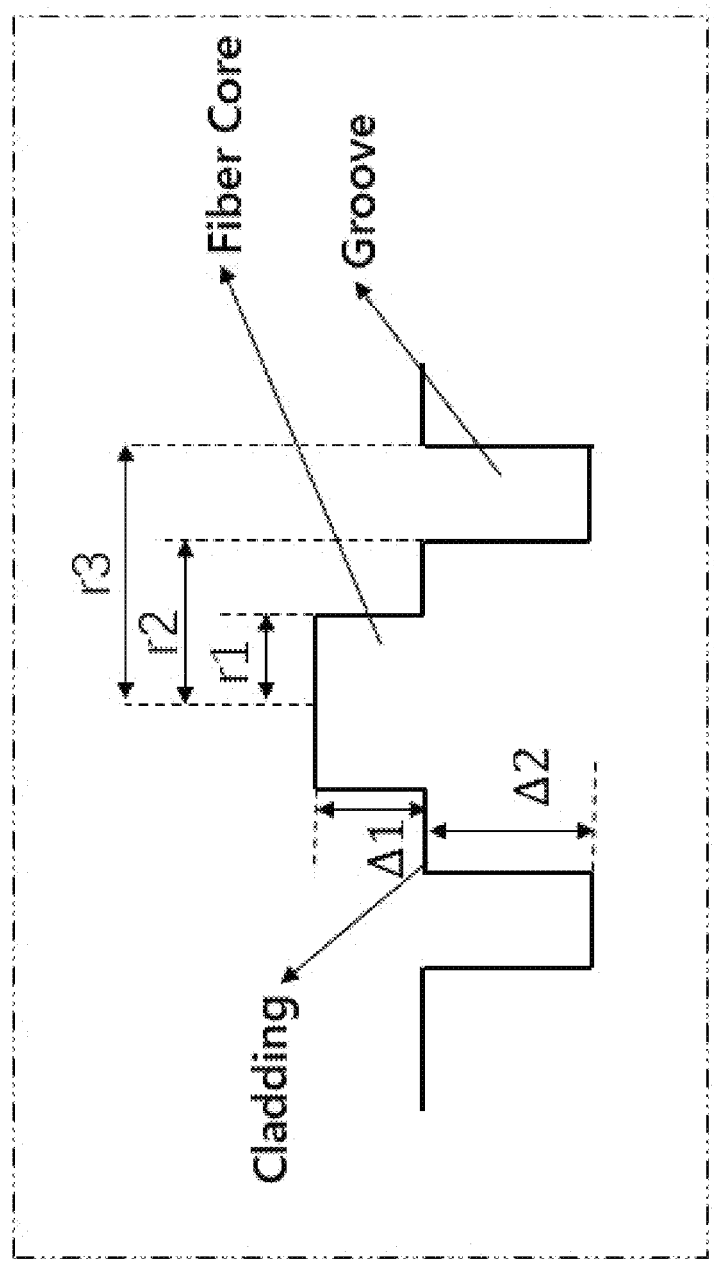
FIG. 3 is a refractive index profile of a heterogeneous groove-type auxiliary seven-core fiber of the QTTH system based on multi-core fiber mode division multiplexing of the disclosure.

More specifically, as shown in FIG. 3, refractive index grooves are provided outside the core of the MCF, and the refractive index of the core of the MCF is $n_1=1.4457$, the refractive index difference between the core of the MCF and the cladding of the MCF is $\Delta 1=0.003$, and the refractive index difference between the grooves of the MCF and the cladding is $\Delta 2=0.003$. The core radius of the MCF is $r_1=5$ μm, the distance between the core center of the MCF and the grooves is $r_2=10$ μm, and the groove width of the MCF is $r_3=3$ μm. Through comprehensive analysis, the parameter setting can effectively reduce the modal dispersion and increase the effective mode field area of the optical fiber.

Figure 4:
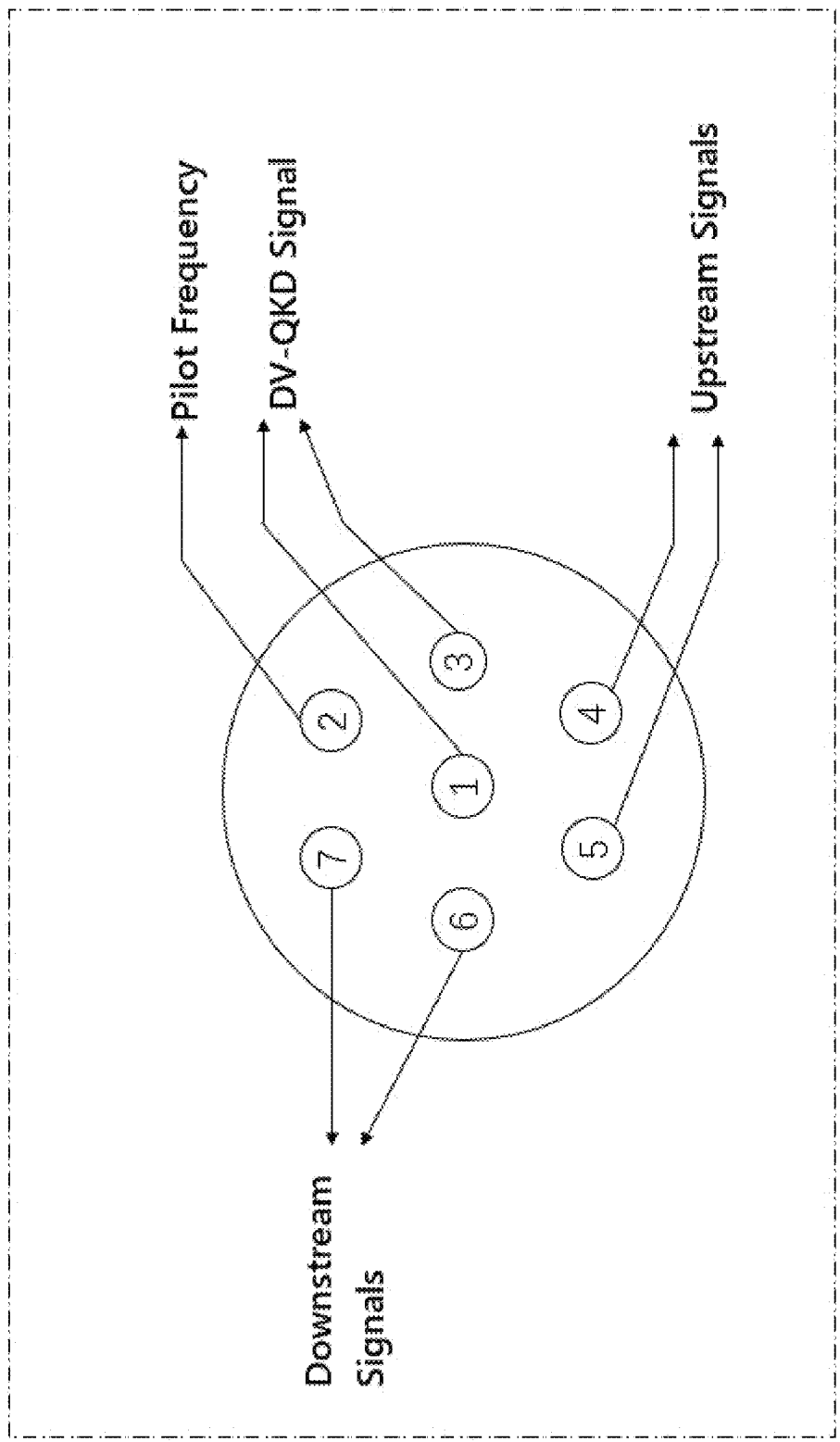
FIG. 4 is a signal distribution diagram of the QTTH system based on multi-core fiber mode division multiplexing of the disclosure.
Figure 5:
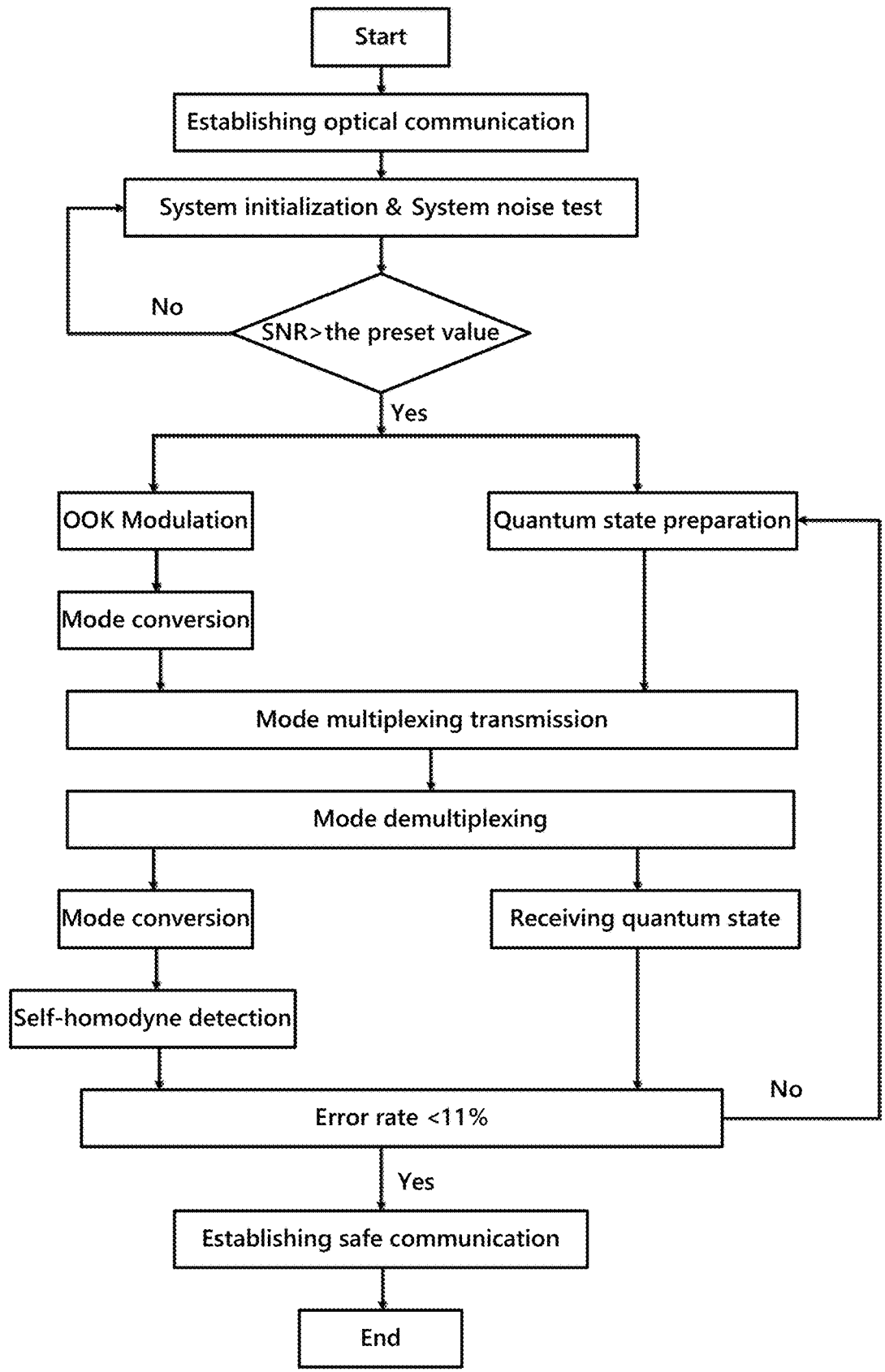
FIG. 5 is a flow chart of the transmission method of the QTTH system based on multi-core fiber mode division multiplexing of the disclosure.

More specifically, as shown in FIG. 4, in the heterogeneous groove-type auxiliary seven-core fiber of MCF, the $1^{th}$ core and the $3^{th}$ transmit DV-QKD signals, the $2^{th}$ core transmits a pilot signal, the $4^{th}$ core and the $5^{th}$ core transmit upstream signals, and the $6^{th}$ core and the $7^{th}$ core transmit downstream signals.

Preferably, when MCF is used for transmission, a wavelength channel of 1550 nm is provided for the quantum signal; either an upstream 1490 nm wavelength channel or a downstream 1310 nm wavelength channel is provided for the classical signal to attenuate the effect of raman scattering noise.

S1, system noise test: checking whether the equipment at an OLT end, an MDM-ODN end and an ONU end being normally operated, and setting initial conditions; under the condition that the OLT end emits laser pulse trains, testing system noise, and judging whether the signal-to-noise ratio is higher than the preset value of a set signal-to-noise ratio; if the signal-to-noise ratio is higher than the preset value of the set signal-to-noise ratio, entering steps S2 and S2', while if the signal-to-noise ratio is lower than the preset value of the set signal-to-noise ratio, generating prompt information; wherein, the signal-to-noise ratio of the test system is provided by the following formula: $SNR=101g\,(P_S/P_N)$, $P_S$ represents a signal power and $P_N$ represents a noise power, and the preset value of the signal-to-noise ratio is 20 dB;

S2, OOK modulation: the classical signal transmitter divides a classical signal into N+1 signals through an optical circulator, wherein one signal serves as a pilot signal, and the other N signals are modulated into N OOK signals through an intensity modulator; meanwhile, the classical signal comprises a pilot signal and N OOK signals;

S2.1, mode conversion: each classical signal obtained in the step S2' is subjected to mode conversion through a mode convertor, so that the classical signals in the basic mode are converted into different and mutually orthogonal modes through the mode convertor, and the quantum signals are transmitted in the basic mode without any mode;

S2', quantum state preparation: the DV-QKD unit prepares a quantum state according to a decoy state asymmetric BB84 protocol to generate a quantum signal, and the specific steps comprise:

S2'. 1: in each pulse sending cycle, Alice randomly prepares and sends a signal state or decoy state to receiver Bob, there are different in average photon number between Alice and Bob. The initial state prepared at Alice $|\varphi\rangle=|\mu\rangle$ is converted into two state $|\varphi_1\rangle=e^{i\Theta_1}|\mu\rangle$ and $|\varphi_2\rangle=e^{i\Theta_2}|\mu\rangle$ of different phases through different ports of the Mach-Zehnder interferometer; after the state $|\varphi_1\rangle$ and $|\varphi_2\rangle$ is transmitted to the MCF, the MCF transforms the state by using different space dimensions of any two fiber cores (such as a core A and a core B); the $|\varphi_1\rangle$ is converted into Quantum State$|A\rangle=e^{i\Theta_1}k_1|\mu\rangle$ after it passing through the core A, the $|\varphi_1\rangle$ is converted into Quantum State$|B\rangle=e^{i\Theta_1}k_2|\mu\rangle$ after it passing through the core B; in the same way, the $|\varphi_2\rangle$ is converted into $|A+B\rangle=e^{i\Theta_2}k_1|\mu\rangle$ and $|A-B\rangle=e^{i\Theta_2}k_2|\mu\rangle$ after it passing through different fiber cores; the four states constitute two mutually unbiased basis, the basis X being defined as ($|A\rangle$, $|B\rangle$), the basis Y being defined as ($|A+B\rangle$, $|A-B\rangle$);

S2'. 2: Alice tells Bob which of these states are signal states and which are decoy states by using classical channels (there are independent classical channels between Alice and Bob for communication);

S3, mode multiplexing transmission: each signal obtained by S2.1 and S2'.1 enter MCF through a mode multiplexer for multiplexing transmission and then reach a mode demultiplexer to be decomposed into multiple signals;

S4, mode conversion: each classical signal is converted into a basic mode signal through a mode convertor, and a quantum signal does not need to be converted; meanwhile, the classical signal and the quantum signal are in a basic mode and can be transmitted through a single-mode optical fiber;

S5, detecting signal: each signal is detected by a photoelectric detector; the detector uses an InGaAs avalanche photodiode operated in a Geiger mode, the working mode of the avalanche diode is divided into a linear mode and a Geiger mode, the avalanche diode working in the linear mode can only respond to classical strong light signals but not respond to weak single photon signals of quanta, and the avalanche diode working in the Geiger mode can respond to both signals;

S6, self-homodyne detection: all signals respectively reach a receiver to complete information transmission, and the pilot frequency replaces the local oscillation to perform self-homodyne detection on each OOK signal, there is no complex DSPs needed;

S7, error rate detection: the ONU end randomly selects a part of DV-QKD screening codes to detect the error rate; and if the measured error code rate value is greater than or equal to the theoretical calculation value of the decoy state, returning to the steps S2 and S2', and if the measured error code rate value is less than the theoretical calculation value of the decoy state, then establishing safe communication; wherein, the theoretical calculation value of the decoy state is 11%, and the specific steps comprising:

S7.1: Bob randomly selects a measuring basis to measure, and declares the measuring basis provided by the Bob and the received quantum state in which cycle;

S7.2: both Alice and Bob keep the correct part of the basis vector comparison as screening codes, and respectively calculate the counting rate and the error rate of the signal state and the decoy state, wherein only one part of the signal state is extracted for error rate estimation;

S7.3: both Alice and Bob determine whether there is wiretapping by carrying out error rate detection of the data, if wiretapping exists, then abandoning secret key and stopping communication, and if wiretapping does not exist, then proceeding with operations such as error correction, confidentiality amplification and the like.

The above embodiments are only intended to illustrate but not to limit the technical solution of the present disclosure; although the present disclosure has been described in detail with reference to the foregoing embodiments, it should be understood by those of ordinary skill in the art that: the technical solutions described in the foregoing embodiments may still be modified, or some technical features may be equivalently replaced; and such modifications or substitutions do not depart from the spirit and scope of the corresponding technical solutions of the embodiments of the present disclosure.

What is claimed is:

1. A QTTH system based on multicore optical fiber mode division multiplexing, wherein comprising: an OLT end (Optical Line Terminal), a MDM-ODN (Mode Division Multiplexing-Optical Distribution Network) and an ONU end (Optical Network Unit), wherein the OLT end, the MDM-ODN and the ONU end are sequentially connected by an optical fiber;

the MDM-ODN comprising a mode multiplexer and a mode demultiplexer, and the mode multiplexer and the mode demultiplexer are connected with each other through MCF, wherein the MCF is a heterogeneous groove-type auxiliary seven-core fiber;

the OLT end comprising a classical signal transmitter, N DV-QKD units and N+1 mode convertors of the OLT end, wherein one end of the N+1 mode convertors is connected with the classical signal transmitter, and the other end of the N+1 mode convertors is connected with a mode multiplexer of the MDM-ODN;

the ONU end comprising N DV-QKD receivers, a classical signal receiver, N+1 mode convertors of the ONU end, 2N+1 PDs and one OC (optical circulator) of the ONU end; the N DV-QKD receivers are respectively connected with the mode demultiplexer through PDs; the N+1 mode convertors of the ONU end are connected with the demultiplexer, wherein the mode convertors of the N ONU end are respectively connected with the classical signal receivers through PDs, and the remaining one mode convertor of the ONU end is respectively connected with each classical signal receiver through one PD and an OC of the ONU end;

when N+1 classical signals sent by the classical signal transmitters are converted from a basic mode to different mutually orthogonal modes through the mode convertors, the mutually orthogonal modes enter the mode multiplexer with the N quantum signals sent by the N DV-QKD units to be converted into a mode suitable for MCF transmission, and are sent to the mode demultiplexer through the MCF to be decomposed into independent N+1 classical signals and N quantum signals; each decomposed classical signal is converted into a mode of a basic mode through the mode convertor of the ONU end and is sent to the classical signal receiver through the connected PD; the quantum signal is sent through the connected PD to the DV-QKD receiver.

2. The system according to claim 1, wherein:
the classical signal transmitter comprising a laser diode, an optical circulator and N intensity modulators, wherein the mode convertors of the N OLT ends are respectively connected with the optical circulator through the intensity modulators, and the remaining one mode convertor of the OLT end is directly connected with the optical circulator;
the N+1 classical signals comprise one pilot signal and N OOK (On-Off Keying) signals.

3. The system according to claim 2, wherein the PD uses an InGaAs avalanche photodiode operating in a Geiger mode.

4. The system according to claim 3, wherein:
when MCF is used for transmission, a 1550 nm wavelength channel is used for a quantum signal; an upstream 1490 nm wavelength channel or a downstream 1310 nm wavelength channel is used for the classical signal.

5. The system according to claim 4, wherein the mode multiplexer and the mode demultiplexer are composed of cascaded mode select couplers.

6. The system according to claim 5, wherein:
the DV-QKD unit is a DV-QKD unit for generating a quantum signal based on a decoy state asymmetric BB84 protocol.

7. The system according to claim 4, wherein:
the DV-QKD unit is a DV-QKD unit for generating a quantum signal based on a decoy state asymmetric BB84 protocol.

8. The system according to claim 2, wherein:
the DV-QKD unit is a DV-QKD unit for generating a quantum signal based on a decoy state asymmetric BB84 protocol.

9. The transmission method according to claim 8, wherein: the DV-QKD unit is a DV-QKD unit for generating a quantum signal based on a decoy state asymmetric BB84 protocol.

10. The transmission method according to claim 9, wherein: the radius of the fiber core of the MCF is 5 mu m, and a refractive index groove is arranged on the outer side of the fiber core of the MCF; the thickness of the refractive index grooves is 3 μm, and the core pitch of the MCF is 42 μm.

11. The transmission method according to claim 9, wherein: the core refractive index of the MCF is 1.4457; the refractive index difference between the core of the MCF and the cladding of the MCF is 0.003, and the refractive index difference between the refractive index grooves and the cladding of the MCF is 0.003.

12. A transmission method of multi-core fiber mode division multiplexing QTTH according to claim 2, wherein comprising the following steps:

S1, system noise test: testing system noise under the condition that the OLT end emits the laser pulse train, and judging whether the signal-to-noise ratio is higher than the preset value of a set signal-to-noise ratio, if the signal-to-noise ratio is higher than the preset value of a set signal-to-noise ratio, entering steps S2 and S2', and if the signal-to-noise ratio is lower than the preset value of a set signal-to-noise ratio, generating prompt information;

S2, quantum state preparation: the DV-QKD unit preparing a quantum state according to a decoy state asymmetric BB84 protocol to generate a quantum signal;

S2', OOK modulation: the classical signal transmitter divides a classical signal into N+1 signals through an optical circulator, wherein one signal serves as a pilot signal, and the other N signals are modulated into N OOK signals through an intensity modulator; meanwhile, the classical signal comprises a pilot signal and N OOK signals;

S2'.1, mode conversion: performing mode conversion on each classical signal obtained in the step S2' through a mode convertor;

S3, mode multiplexing transmission: the signals obtained through S2 and S2'0.1 enter MCF through a mode multiplexer for multiplexing transmission and then reach a mode demultiplexer to be decomposed into multiple signals;

S4, mode conversion: each classical signal is converted into a basic mode signal through a mode convertor;

S5, self-homodyne detection: performing self-homodyne detection on each OOK signal;

S6, error rate detection: the ONU end randomly selects a part of DV-QKD screening codes to detect the error rate; and if the measured error code rate value is greater than or equal to the theoretical calculation value of the decoy state, returning to the steps S2 and S2'; and if the measured error code rate value is less than the theoretical calculation value of the decoy state, then establishing safe communication.

13. The transmission method according to claim 12, wherein: the PD uses an InGaAs avalanche photodiode operating in a Geiger mode.

14. The transmission method according to claim 13, wherein: when MCF is used for transmission, a 1550 nm wavelength channel is used for a quantum signal; an upstream 1490 nm wavelength channel or a downstream 1310 nm wavelength channel is used for the classical signal.

15. The transmission method according to claim 14, wherein: the mode multiplexer and the mode demultiplexer are composed of cascaded mode select couplers.

16. The system according to claim 1, wherein:
the DV-QKD unit is a DV-QKD unit for generating a quantum signal based on a decoy state asymmetric BB84 protocol.

17. The system according to claim 16, wherein:
the radius of the fiber core of the MCF is 5 mu m, and a refractive index groove is arranged on the outer side of the fiber core of the MCF; the thickness of the refractive index grooves is 3 μm, and the core pitch of the MCF is 42 μm.

18. The system according to claim 17, wherein:
the core refractive index of the MCF is 1.4457; the refractive index difference between the core of the MCF and the cladding of the MCF is 0.003, and the refractive index difference between the refractive index grooves and the cladding of the MCF is 0.003.

19. A transmission method of multi-core fiber mode division multiplexing QTTH according to claim 1, wherein comprising the following steps:
S1, system noise test: testing system noise under the condition that the OLT end emits the laser pulse train, and judging whether the signal-to-noise ratio is higher than the preset value of a set signal-to-noise ratio, if the signal-to-noise ratio is higher than the preset value of a set signal-to-noise ratio, entering steps S2 and S2', and if the signal-to-noise ratio is lower than the preset value of a set signal-to-noise ratio, generating prompt information;

S2, quantum state preparation: the DV-QKD unit preparing a quantum state according to a decoy state asymmetric BB84 protocol to generate a quantum signal;

S2', OOK modulation: the classical signal transmitter divides a classical signal into N+1 signals through an optical circulator, wherein one signal serves as a pilot signal, and the other N signals are modulated into N OOK signals through an intensity modulator; meanwhile, the classical signal comprises a pilot signal and N OOK signals;

S2'.1, mode conversion: performing mode conversion on each classical signal obtained in the step S2' through a mode convertor;

S3, mode multiplexing transmission: the signals obtained through S2 and S2'.1 enter MCF through a mode multiplexer for multiplexing transmission and then reach a mode demultiplexer to be decomposed into multiple signals;

S4, mode conversion: each classical signal is converted into a basic mode signal through a mode convertor;

S5, self-homodyne detection: performing self-homodyne detection on each OOK signal;

S6, error rate detection: the ONU end randomly selects a part of DV-QKD screening codes to detect the error rate; and if the measured error code rate value is greater than or equal to the theoretical calculation value of the decoy state, returning to the steps S2 and S2'; and if the measured error code rate value is less than the theoretical calculation value of the decoy state, then establishing safe communication.

20. The transmission method according to claim 19, wherein:
the preset value of the signal-to-noise ratio is 20 dB, and the theoretical calculation value of the decoy state is 11%.

* * * * *